United States Patent
La Forest et al.

(10) Patent No.: US 7,025,913 B2
(45) Date of Patent: Apr. 11, 2006

(54) DELIVERY OF PITCH/THERMOPLASTIC/THERMOSET RESINS IN RTM SYSTEMS

(75) Inventors: Mark L. La Forest, Granger, IN (US); Christopher S. Wahlers, South Bend, IN (US); Roger W. Holloway, North Liberty, IN (US)

(73) Assignee: Honeywell International Inc., Morristown, NJ (US)

( * ) Notice: Subject to any disclaimer, the term of this patent is extended or adjusted under 35 U.S.C. 154(b) by 314 days.

(21) Appl. No.: 10/407,472

(22) Filed: Apr. 4, 2003

(65) Prior Publication Data

US 2004/0195712 A1    Oct. 7, 2004

(51) Int. Cl.
B29C 45/02    (2006.01)
B29C 45/14    (2006.01)

(52) U.S. Cl. ............ 264/29.1; 264/102; 264/257; 264/321; 264/328.4; 425/129.1; 425/145; 425/217; 425/557

(58) Field of Classification Search ........ 264/29.1, 264/29.6, 257, 328.6, 102, 321, 328.4; 425/145, 425/557, 561, 129.1, 217
See application file for complete search history.

(56) References Cited

U.S. PATENT DOCUMENTS

| | | |
|---|---|---|
| 3,674,398 A | 7/1972 | Baumgartner et al. |
| 4,412,804 A | 11/1983 | Huther |
| 4,986,943 A | 1/1991 | Sheaffer et al. |
| 5,059,370 A | 10/1991 | Kojima |
| 5,187,001 A * | 2/1993 | Brew .................. 425/145 |
| 5,248,467 A | 9/1993 | Cushman |
| 5,306,448 A | 4/1994 | Kromrey |
| 5,654,059 A | 8/1997 | Hecht |
| 5,770,127 A | 6/1998 | Abrams et al. |
| 6,079,866 A * | 6/2000 | Keulen et al. ........... 366/144 |

(Continued)

FOREIGN PATENT DOCUMENTS

EP    0 348 129 A2    12/1989

(Continued)

OTHER PUBLICATIONS

J. L. White et al., "A Processing Window for Injection of Mesophase Pitch into a Fiber Preform", Carbon, vol. 32, No. 2, 1994, pp. 301-310.

(Continued)

Primary Examiner—Allan R. Kuhns
(74) Attorney, Agent, or Firm—Birch, Stewart, Kolasch & Birch, LLP

(57) ABSTRACT

Resin or pitch is melted in a melt blender apparatus (11) and then loaded, into a heated jacketed holding tank (12). A pair of feed lines (14, 16) receives resin from the holding tank (12) and feeds an upper gear pump (15) and a lower gear pump (17). A mixing enhancement such as a static mixer (18, 19) is located in each of the feed lines (14, 16) between the gear pumps (15, 17) and the resin delivery ends (25, 26) of the feed lines. The resin-melt feed lines may be equipped with pressure indicators (27, 28, 32, 34) and pressure relief valves (23, 24). The resin-melt feed lines may also be equipped with pump accumulators (31, 33). Resin melt pressure created by the gear pumps (15, 17) forces a piston inside the accumulator back to the desired position. The accumulators (31, 33) can also be used to maintain constant pressure in the feed stock. Resin can be recycled from the accumulators (31, 33) into the melt blender (11).

18 Claims, 4 Drawing Sheets

U.S. PATENT DOCUMENTS

| | | | |
|---|---|---|---|
| 6,099,906 A * | 8/2000 | Palmer et al. | ............... 427/296 |
| 6,168,408 B1 | 1/2001 | Boime et al. | |
| 6,325,608 B1 | 12/2001 | Shivakumar et al. | |
| 6,521,152 B1 | 2/2003 | Wood et al. | |
| 6,537,470 B1 | 3/2003 | Wood et al. | |

FOREIGN PATENT DOCUMENTS

| | | |
|---|---|---|
| EP | 0 919 350 A2 | 6/1999 |
| GB | 2 301 059 A | 11/1996 |
| WO | WO 02/18120 A2 | 3/2002 |
| WO | WO 02/058919 A1 | 8/2002 |
| WO | WO 2004/052629 A1 | 6/2004 |

OTHER PUBLICATIONS

"Was ist RTM", XP002295827, pp. 1-4, retrieved from the internet Sep. 9, 2004.

"Welcome to Resin Transfer Molding (RTM) Page", XP002295828, pp. 1-6, retrieved from the internet Sep. 9, 2004.

"Materials for Reaction Injection Molding (RIM) Processing", XP002295829, pp. 1-10, retrieved from the internet Sep. 9, 2004.

Addeo et al., Patent Abstracts of Japan, publication No. 05-212745, published Aug. 24, 1993.

* cited by examiner

DELIVERY OF PITCH/THERMOPLASTIC/THERMOSET RESINS IN RTM SYSTEMS

FIELD OF THE INVENTION

The present invention relates to resin transfer molding (RTM) systems and provides a basis for a resin transfer molding system that has a great deal of flexibility in the infiltration of porous carbon preforms with thermoset or thermoplastic resins or with pitch. This invention avoids the constraints due to extrusion and injection, which characterize conventional RTM systems, by its utilization of gear pumps and/or piston accumulators. In addition, the present invention provides built-in means for resin re-cycle.

BACKGROUND OF THE INVENTION

Prior art RTM systems make use of extrusion devices (for instance, single-screw, twin-screw, or twin-rotor devices) and injection molding. The present invention provides a simpler, more robust, and more versatile process-controlled system.

The present invention contemplates a material handling system. There are two major phases in resin transfer molding processes the molding phase itself, which takes place inside the mold, and the resin delivery phase, which provides the resin to the mold. The present invention is concerned with the resin delivery phase of RTM processes and apparati.

The resin delivery phase includes providing the RTM system with resin and additives, blending and melting the resin/additive mixture, and delivering the melted resin blend to the mold at a desired temperature and pressure. Also of concern in the resin delivery phase of RTM processes is disposal of the resin that remains in the RTM feeder apparatus at the end of a processing cycle. The present invention allows for great versatility in infiltrating porous preforms or flat annular carbon brake disks.

SUMMARY OF THE INVENTION

One embodiment of the present invention provides a rapid resin or pitch transfer molding process that includes: melting a resin or pitch selected from the group consisting of synthetic pitch, coal tar pitch, petroleum pitch, mesophase pitch, high char yield thermoset resin, and mixtures thereof in a melt blender; loading the melted resin by means of a gear pump into a heated jacketed holding tank; feeding melted resin from the holding tank through upper gear pump and lower gear pump to accumulators and through static mixers to resin delivery ends of the feed lines; and recycling resin from said accumulators into said melt blender.

Another embodiment of this invention is a rapid resin or pitch transfer molding apparatus comprising a melt blender apparatus having a vent port, which is connected by resin feed lines and a gear pump to a holding tank having a vent port. The holding tank is equipped with means to monitor the level of resin therein, and a pair of feed lines are positioned to receive resin from the holding tank and to feed an upper gear pump and a lower gear pump. Mixing means are located in each of the feed lines between the gear pumps and resin delivery ends of the feed lines. The resin-melt feed lines are also equipped with piston accumulators.

In accordance with the present invention, a mold may be both top fed and bottom fed through gear pumps and/or piston-type melt accumulators or piston pumps. Incidentally, references to "top" and "bottom" herein are for convenience, and are not intended to exclude practice of the present invention in a mold having, for instance, side-by-side halves rather than upper and lower halves. Also, the term "half" herein, unless otherwise noted, should be understood in a qualitative rather than in a quantitative sense.

In accordance with this invention, the gear pumps can be used to infiltrate preforms simultaneously, or they can be used with a delay. For instance, the bottom resin feed line can be activated and then shut off, at which time the top resin feed line can be activated. This approach is especially valuable when the preform being infiltrated would be adversely affected by having two melt streams converge and create turbulence within its fiber structure. Likewise, in some applications, it may be desirable to complete the infiltration operation using only the top resin feed line or only the bottom resin feed line. Alternatively, the melt accumulators or piston pumps can be used to fill preforms simultaneously, individually, or by delay. Finally, the gear pumps and the melt accumulators/piston pumps can be used in any combination to effect infiltration.

Pressure relief valves are used to eliminate pressure spikes during the infiltration process. This decreases the chances of damages to the preforms during the infiltration process. Gasses and moisture are removed through melt blender venting and holding tank venting to eliminate possible moisture or volatiles from entering the mold during infiltration. This also decreases the venting demands in the mold itself. Pitch and resin melting is preferably conducted under a nitrogen blanket. A blanket of nitrogen (or another inert gas) keeps moisture and oxygen away from the melted resin or pitch being supplied in the RTM process. The nitrogen blanket may be provided for instance, by supplying pressurized nitrogen into the melt blender tank. Excess nitrogen will vent through the vent ports on the melt blender tank and the holding tank.

In accordance with this invention, the mold and mold insert tooling are of course vented. However, details of the venting make up part of a separate invention. The molds utilized with the present novel resin delivery system can be used with vacuum, but vacuum is not required.

An important feature of the present invention is the means that it provides for conveniently recycling melted pitch or resin materials, thereby eliminating scrap loss. Melt from the accumulators and/or the holding tank can be emptied back into the melt blender, as opposed to being dumped and creating scrap.

BRIEF DESCRIPTION OF THE DRAWINGS

These and other objects and features of the invention will become more apparent from the following detailed description of the invention and the accompanying illustrative drawings.

DETAILED DESCRIPTION OF THE INVENTION

Figure 1:
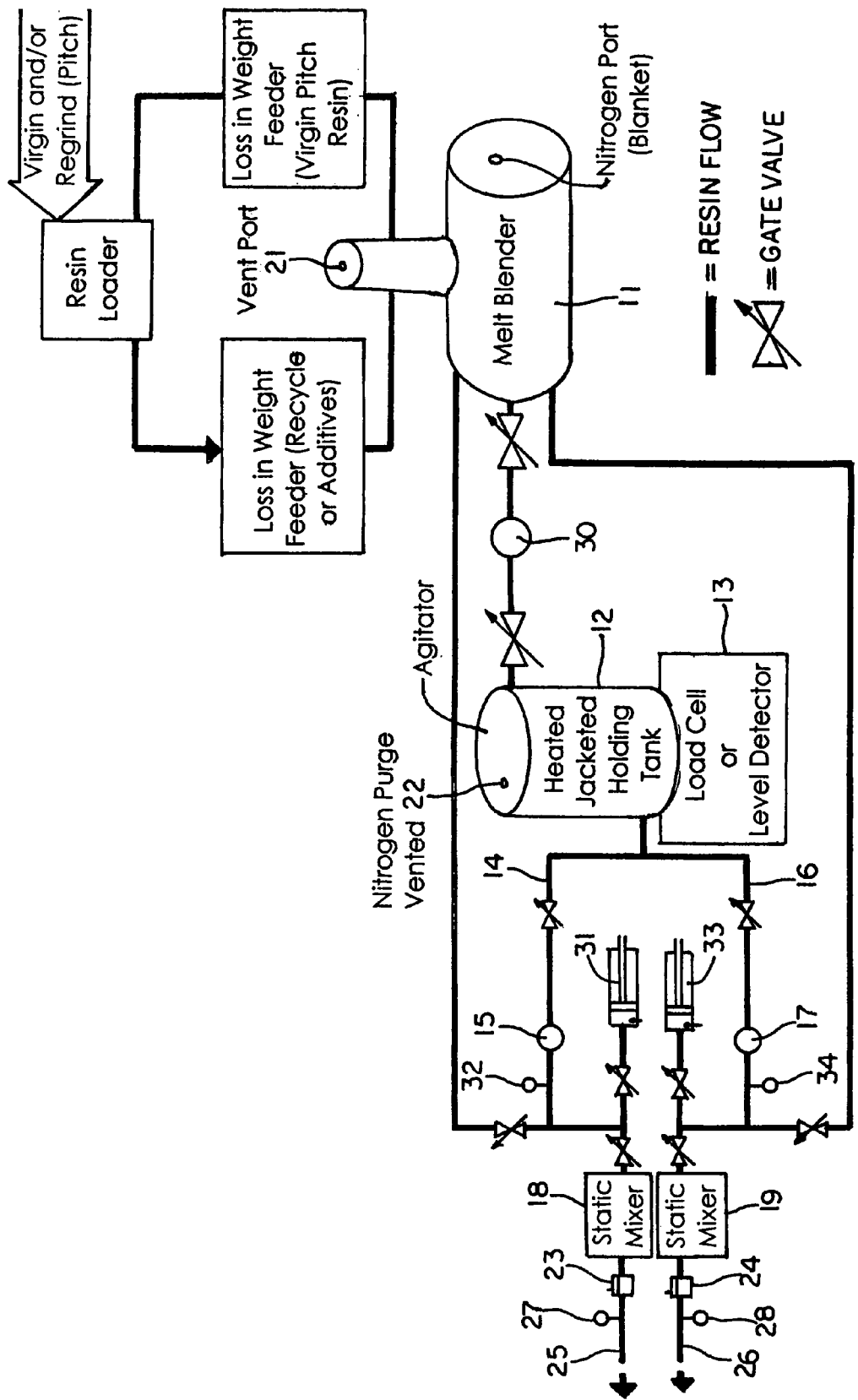
FIG. 1 is a schematic drawing of a pump-driven resin molding apparatus according to one embodiment of the present invention.

This invention provides a rapid resin or pitch transfer molding apparatus which includes means for melting and conveying a resin or pitch, the means comprising a holding tank for melted resin or pitch, a pair of gear pumps and/or a pair of piston pumps disposed to deliver pressurized melted resin or pitch through a pair of static mixers to a mold, and pressure indicator gauges and pressure relief valves downstream of said static mixers. The invention contemplates a mold arranged to receive melted resin or pitch that is conveyed from the static mixers into the mold, means disposed at the mold to constrain the mold during supply of the resin or pitch into the mold, and means for recycling melted resin or pitch from the conveying means into the holding tank.

The apparatus of the invention may also include an accumulator, for instance a hydraulically actuated piston or electrically driven accumulator, disposed between the conveying means and the mold.

The rapid resin or pitch transfer molding apparatus can also include a melt blender disposed between the conveying means and the holding tank. The melt blender and the holding tank can include an inert gas supply system disposed to provide an inert gas blanket in said melt blender and said holding tank.

The present invention also provides an improved rapid resin or pitch transfer molding process, designed to be used with a porous fibrous preform, carbon fiber preform, non-woven preform, random fiber preform with binder, rigidized preform, or foam preform. The process of this invention includes the steps of: arranging the porous preform in a mold cavity, the preform being at or brought to a temperature above a melting point of a resin or pitch to be transferred into the preform; melting and pressurizing the resin or pitch in the apparatus described herein and delivering that resin or pitch into the mold cavity in order to effect impregnation of the preform; cooling the resulting resin-infiltrated or pitch-infiltrated preform to below the melting point of the resin or pitch; and removing the impregnated preform from the mold.

The mold will generally have a top half and a bottom half opposed to the top half so that the top half and the bottom half form a mold cavity. The mold will generally also have a pair of valves, wherein the valves can admit resin or pitch into melt supply channels in the top half and the bottom half of the mold, and an arrangement for venting and/or providing vacuum to the mold.

In accordance with this invention, the preform, which is a porous carbon body, may be heated to a temperature between about 100 through 425° C. The mold may be heated to a temperature between about 100 through 310° C. The resin or pitch may be synthetic pitch, coal tar pitch, petroleum pitch, mesophase pitch, high char yield thermoset resin, or combinations thereof. Single or multiple preforms may be placed in a single mold. A vacuum may be provided to the mold prior to injecting the molten resin or pitch thereinto.

In the rapid resin or pitch transfer molding process of this invention, the impregnated preform may be stabilized by heating the impregnated preform in the presence of an oxygen containing gas at a temperature of about 150 through 240° C. The process may further comprise carbonization of the oxidized impregnated preform, and may still further comprises heating to a temperature of about 1600 through 2500° C. to graphitize the carbonized impregnated preform.

The graphitized preform may be further densified using either chemical vapor deposition/chemical vapor infiltration or resin transfer molding.

To illustrate the present invention with respect to FIG. 1, raw material, such as AR mesophase pitch resin (available from Mitsubishi Gas Chemical Company, Inc.) is melted in a melt blender apparatus (11), and then loaded, for instance by means of a gear pump (30), into a heated jacketed holding tank (12). While initially, the resin will be "virgin", that is, not previously used, as the process continues, the resin supply can also include recycled resin mixture (that is, resin plus conventional RTM additives). The melted pitch or resin is preferably kept under a nitrogen blanket to prevent the resin from advancing, and to forestall the molecular weight breakdown to which some resins are subject. Gasses and moisture may be removed from the system through a melt blender vent port (21) and a holding tank vent port (22) to eliminate possible moisture or volatiles from entering the mold during infiltration. This approach eliminates the necessity for drying the resin prior to use.

The level of resin charged in the holding tank can be monitored by a load cell or level detector (13). A pair of feed lines (14, 16) receives resin from the holding tank (12) and feeds upper gear pump (15) and lower gear pump (17). FIG. 1 depicts a holding tank, which is fed with melted pitch or resin from the melt blender. However, in alternative embodiment of this invention, the resin feeder lines can lead directly from a melt blender to the mold. In the direct-feed embodiment, the melted resin would not be supplied through a holding tank.

A mixing enhancement such as a static mixer (18, 19) is preferably located in each of the feed lines (14, 16) between the gear pumps (15, 17) and the resin delivery ends (25, 26) of the feed lines. A static mixer helps ensure a more homogeneous melt temperature by adding mechanical work to the resin, breaking up resin flow patterns and improving the mixing of any additives (such as friction modifiers, resin stabilizers, and anti-oxidants) in the resin material. A static mixer may contain static mixing elements, such as stainless steel bars welded together, which act as flow channels to carry melted resin (and any other additives) from wall to wall in the barrel. The static mixer elements near the end of the feed lines thus can enhance the use of the gear pump and/or piston pump feed by improving the mixing of the resin melt and reducing temperature variation.

The resin-melt feed lines may also be equipped with pressure indicators (27, 28, 32, 34) and pressure relief valves (23, 24). Pressure relief valve at this point eliminate pressure spikes during the infiltration process that cannot be effectively handled through software. This lessens the possibility of damage to preforms during the infiltration process. Resin withdrawn from the system to lower pressure can be recycled.

The resin-melt feed lines may also be equipped with accumulators (31, 33). The accumulators may be, for instance, piston accumulators (31, 33). Resin melt pressure created by the gear pumps (15, 17) forces a piston inside the accumulator back to the desired position. The accumulators (31, 33) can also be used to maintain constant pressure in the feed stock. This invention can, however, also be practiced by relying solely upon the gear pumps (15, 17) to deliver the melt into the mold, without utilization of accumulator and piston.

The resin-melt feed lines may conveniently end in retractable nozzle tips (not shown), which are configured to be compatible with the external openings (for instance, sprue bushings) of melt supply channels in the mold.

Figure 2:
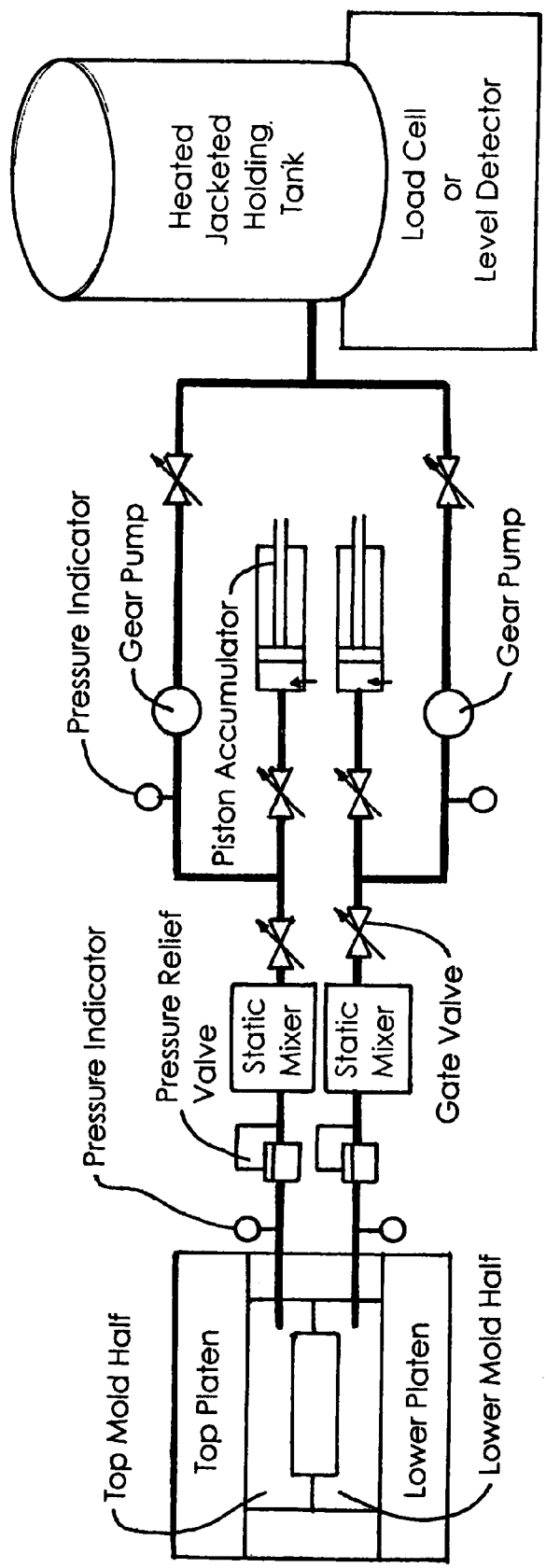
FIG. 2 is a schematic drawing of a pump-driven resin molding apparatus similar to that in FIG. 1, but omitting the melt blender feature and illustration relative mold positioning.

FIG. 2 is like FIG. 1 a schematic drawing of a pump-driven resin molding apparatus, but the drawing in FIG. 2 omits the melt blender feature and adds an illustration of relative mold positioning.

When the accumulator is used in the present invention, once the desired volume of resin has been accumulated, the accumulator piston moves forward and forces the controlled volume of resin through the transfer line into the mold cavity. An arrangement of valves is provided in relation to the transfer pipe to control flow and backflow of the resin, respectively. The part (preform) to be infiltrated is contained within a mold. For the purposes of this invention, a mold is a containing vessel in which the porous body or preform is contained and into which infiltration of the resin occurs. This invention makes use of mold inserts that are replaceable and that are configured to correspond to the preform being infiltrated.

The mold is contained or located within a press, for instance, a hydraulic press or an electrically-actuated press. Although a vertically acting press is generally more convenient, a horizontally acting press could also be used.

Figure 3:
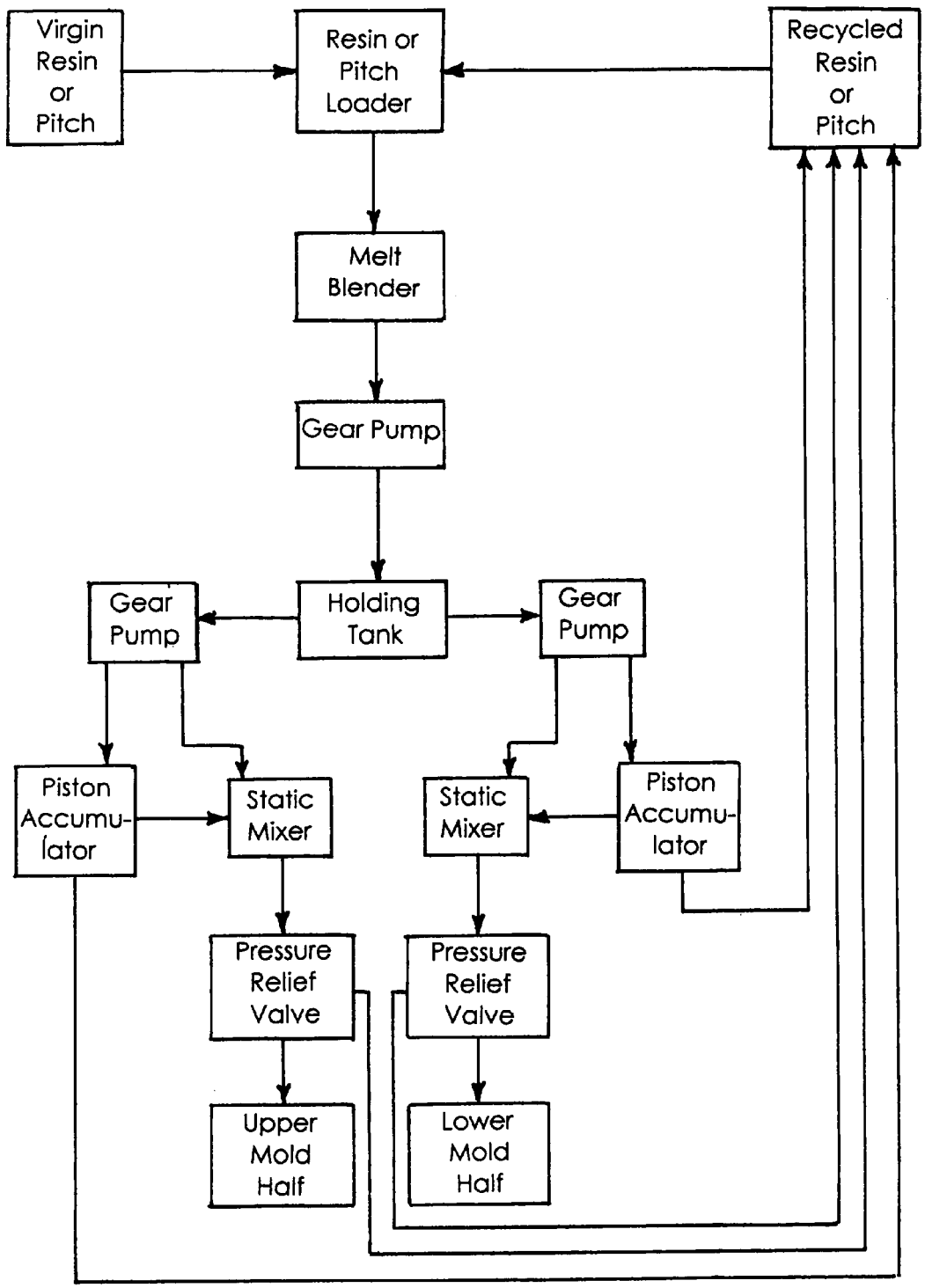
FIG. 3 is a block diagram illustrating the apparatus and process according to an embodiment of the present invention.
Figure 4:
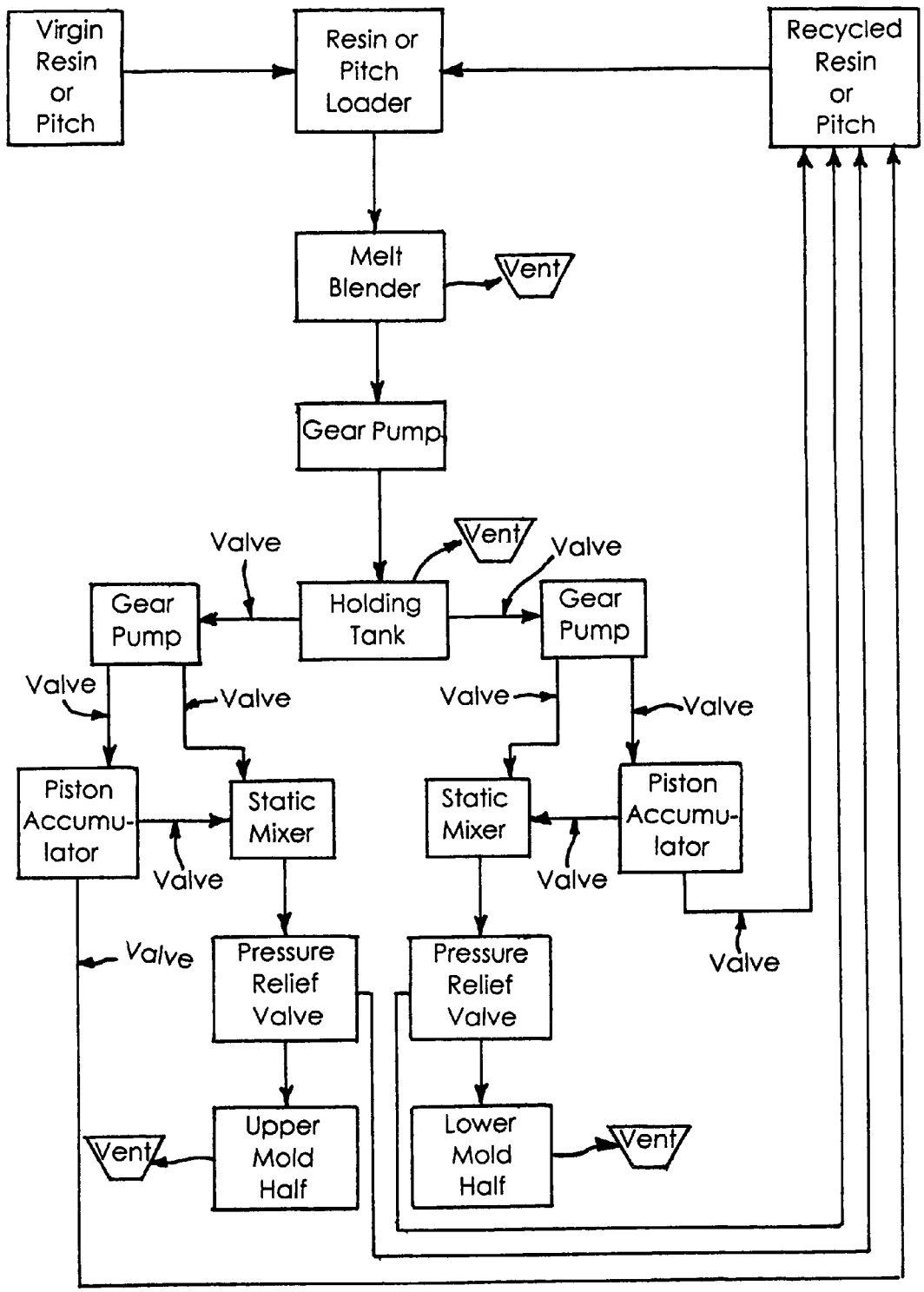
FIG. 4, correspond to FIG. 3, but is marked to show the relative locations of vents and some valves in the present invention.

FIG. 3 is a block diagram illustrating the apparatus and process according to an embodiment of the present invention. FIG. 4 corresponds to FIG. 3, but is marked to show the relative locations of vents and some valves in the present invention.

Virgin resin or pitch (or reground derived pitch from another manufacturing operation), and also optionally, recycled resin or pitch flowing back from the apparatus, are placed in a resin or pitch loader. A gear pump may used to transfer the resin or pitch to a melt blender. Preferably, however, both the virgin resin or pitch and the recycled resin or pitch are transferred from the resin or pitch loader into the melt blender through a vented port by means of loss-in-weight feeders. The melt blender is conveniently configured with a nitrogen port, in order to provide the system with a nitrogen blanket. Resin is transferred from the melt blender by means of a gear pump, which is flanked by shut-off valves, into a holding tank. Generally, the holding tank will be jacketed and heated, and will be provided with a load cell or level detector in order to facilitate resin delivery. The holding tank will also generally be equipped with an agitator, and will have a nitrogen purge vent.

Resin will flow from the holding tank through a pair of gear pumps, which will supply the resin through a static mixer to the mold apparatus. Shut-off valves are located between the holding tank and these gear pumps. Additional shut-off valves are located between these gear pumps and the melt blender, and between these gear pumps and the static mixers. In accordance with the present invention, the resin or pitch delivery apparatus includes pressure indicators located between the gear pumps and the static mixers and pressure indicators and pressure relief valves located between the static mixers and the mold.

The apparatus of this invention also includes piston accumulators which, like the mold apparatus, are fed by the gear pumps located after the holding tank. The piston accumulators supplement the action of those gear pumps. Shut-off valves are located between the piston accumulators and the post-holding tank gear pumps.

RECYCLING. Once a molding cycle is complete, the valves located between the static mixers and the post-holding tank gear pumps can be closed, and the valves between the post-holding tank gear pumps and the melt blender can be opened. Those gear pumps and/or the piston accumulators can then be activated to push residual melted resin or pitch in the piping and accumulators back into the melt blender.

What is claimed is:

1. A rapid resin or pitch transfer molding apparatus which comprises:
    means for melting and conveying a resin or pitch, said means comprising a holding tank for melted resin or pitch, a pair of gear pumps and/or a pair of piston pumps disposed to deliver pressurized melted resin or pitch through a pair of static mixers to a mold, and pressure indicator gauges and pressure relief valves downstream of said static mixers;
    a melt blender disposed between the conveying means and the holding tank, said melt blender being connected by resin feed lines and a gear pump to said holding tank;
    a mold arranged to receive melted resin or pitch that is conveyed from the static mixers into the mold;
    an accumulator disposed between the conveying means and the mold;
    means disposed at the mold to constrain the mold during supply of the resin or pitch into the mold; and
    means for recycling melted resin or pitch from the conveying means into said holding tank.

2. The rapid resin or pitch transfer molding apparatus according to claim 1, wherein the accumulator is a hydraulically actuated piston or electrically driven accumulator.

3. The rapid resin or pitch transfer molding apparatus according to claim 1, wherein the melt blender and the holding tank comprise an inert gas supply system disposed to provide an inert gas blanket in said melt blender and said holding tank.

4. A rapid resin or pitch transfer molding apparatus in accordance with claim 1, wherein said melt blender apparatus has a vent port and said holding tank has a vent port, said holding tank being equipped with means to monitor the level of resin therein, wherein a pair of feed lines are positioned to receive resin from the holding tank and to feed an upper gear pump and a lower gear pump, wherein mixing means are located in each of the feed lines between the gear pumps and resin delivery ends of the feed lines, and wherein the resin-melt feed lines are equipped with piston accumulators.

5. A rapid resin or pitch transfer molding process, comprising the steps of:
    arranging a porous preform in a mold cavity, said preform being at or brought to a temperature above a melting point of a resin or pitch to be transferred into the preform;
    melting and pressurizing the resin or pitch in the apparatus according to claim 1 and delivering said resin or pitch into the mold cavity in order to effect impregnation of the preform;
    recycling melted resin or pitch from the conveying means in said apparatus into the holding tank in said apparatus:
    cooling the resulting resin-infiltrated or pitch-infiltrated preform to below the melting point of the resin or pitch; and
    removing the impregnated preform from the mold.

6. The rapid resin or pitch transfer molding process according to claim 5, wherein the mold comprises:
    a top half;
    a bottom half opposed to the top half so that the top half and the bottom half form a mold cavity;

a pair of valves, wherein the valves can admit resin or pitch into melt supply channels in the top half and the bottom half of the mold; and an arrangement for venting and/or providing vacuum to the mold.

7. The rapid resin or pitch transfer molding process according to claim 6, wherein the preform is one of a fibrous preform, a carbon fiber preform, a nonwoven preform, a random fiber preform with a binder, a rigidized preform, and a foam preform.

8. The rapid resin or pitch transfer molding process according to claim 7, wherein the preform is a porous carbon body.

9. The rapid resin or pitch transfer molding process according to claim 6, wherein the preform is heated to a temperature between about 100 through 425° C.

10. The rapid resin or pitch transfer molding process according to claim 6, wherein the mold is heated to a temperature between about 100 through 310° C.

11. The rapid resin or pitch transfer molding process according to claim 6, wherein the resin or pitch is synthetic pitch, coal tar pitch, petroleum pitch, mesophase pitch, high char yield thermoset resin, or combinations thereof.

12. The rapid resin or pitch transfer molding process according to claim 6, in which multiple preforms are placed in a single mold.

13. The rapid resin or pitch transfer molding process according to claim 6, which further comprises:

stabilizing the impregnated preform by heating the impregnated preform in the presence of an oxygen containing gas at a temperature of about 150 through 240° C.

14. The resin transfer molding process according to claim 6, which further comprises carbonization of the oxidized impregnated preform.

15. The rapid resin or pitch transfer molding process according to claim 14, which further comprises heating to a temperature of about 1600 through 2500° C. to graphitize the carbonized impregnated preform.

16. The rapid resin or pitch transfer molding process according to claim 15, wherein the graphitized preform is further densified using chemical vapor deposition/chemical vapor infiltration or resin transfer molding.

17. The rapid resin or pitch transfer molding process according to claim 6, wherein a vacuum is provided to the mold prior to injecting the molten resin or pitch.

18. A rapid resin or pitch transfer molding process which comprises the steps of:

melting a resin or pitch selected from the group consisting of synthetic pitch, coal tar pitch, petroleum pitch, mesophase pitch, high char yield thermoset resin, and mixtures thereof in a melt blender;

loading the melted resin or pitch by means of a gear pump into a heated jacketed holding tank;

feeding melted resin or pitch from the holding tank through upper gear pump and lower gear pump to accumulators and through static mixers to resin delivery ends of the feed lines to a mold cavity; and recycling resin or pitch from said accumulators into said melt blender.

* * * * *